Patented July 15, 1952

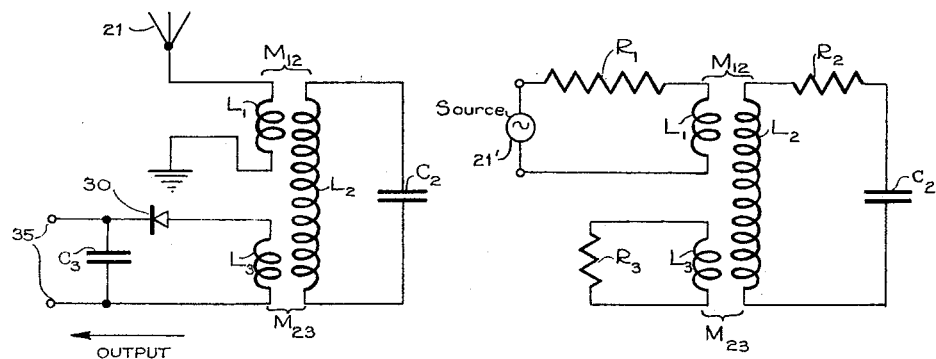
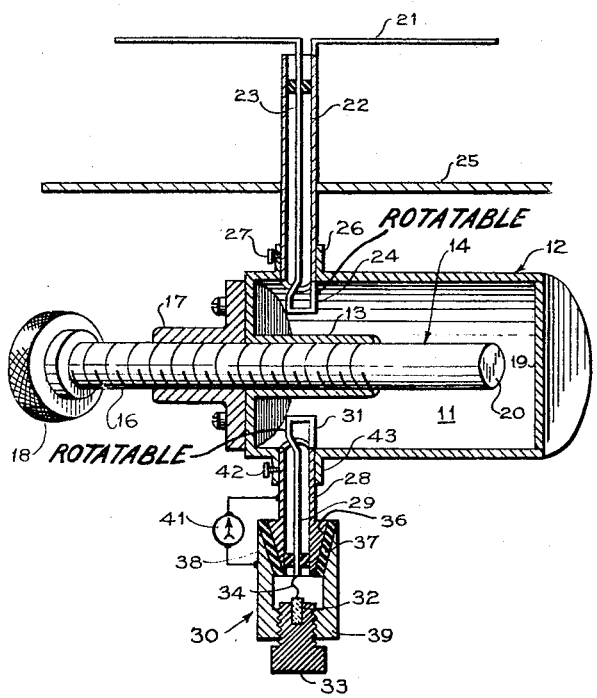

2,603,754

UNITED STATES PATENT OFFICE 2,603,754

HIGH-FREQUENCY APPARATUS

William W. Hansen, Garden City, N. Y., assignor, by mesne assignments, to The Board of Trustees of the Leland Stanford Junior University, Stanford University, Calif., a corporate body of California Application March 17, 1945, Serial No. 583,311

17 Claims. (Cl. 250—39)

The present invention relates to the art including devices operating at ultra-high frequencies of the order of 300 megacycles per second and higher, corresponding to wavelengths of one meter or less, and is especially adapted for use at frequencies of the order of $10^9$ to $10^{10}$ cycles per second, known as microwaves.

The present invention is directed more particularly to receiving, detecting, and indicating devices operable at such microwave frequencies. According to the present invention, an extremely simple, compact and rugged device is provided for receiving, detecting, and indicating the intensity or frequency of microwaves. The present device is provided with a high selectivity and a maximum power sensitivity. Moreover, both the selectivity and sensitivity are made variable to adapt the device to varying conditions. This is especially useful with respect to selectivity, since it has been found that the selectivity may actually be too great for some purposes for which the device is adapted.

Accordingly, it is an object of the present invention to provide improved ultra-high-frequency receiver detector or indicator devices which are compact, simple, and rugged.

It is another object of the present invention to provide improved detecting apparatus for ultra-high-frequency waves.

It is a further object of the present invention to provide improved apparatus for ultra-high frequencies having a high and adjustable selectivity.

It is another object of the present invention to provide simple and compact apparatus useful for indicating the frequency of ultra-high-frequency waves.

Other objects and advantages of the invention will become apparent from the specification, taken in connection with the accompanying drawings, wherein Fig. 1 is a longitudinal cross-sectional view of a preferred embodiment of the present invention;

Fig. 2 is an equivalent circuit diagram of the device of the present invention; and Fig. 3 is a further equivalent circuit diagram useful in explaining the design and operation of the invention.

Referring to Fig. 1, there is shown a cavity resonator or resonant chamber 11 comprising a generally cylindrical container or casing 12 having a reentrant hollow cylindrical sleeve portion 13 in which is slidably positioned an adjustable tuning plunger 14. Tuning plunger 14 carries a threaded portion 16 cooperating with an internally threaded member 17 rigidly fixed to the resonator casing 12. Fixed to the end of the plunger 16 is an adjusting knob 18. Accordingly, by rotating the knob 18, the plunger 14 is advanced into or withdrawn from the resonant cavity defined by the casing 12. This adjusts the effective capacitance of the adjustable condenser formed between the end 20 of the plunger 14 and the inner surface 19 of the adjoining end wall of casing 12 and simultaneously adjusts the length of the coaxial transmission line section whose outer conductor is formed by casing 12 and whose inner conductor is formed by member 13 and plunger 14. Both of these effects produce a variation in the resonant frequency of the resonator 11, providing tuning for the present device.

Energy is supplied to the resonator 11 by a dipole antenna 21 having one arm connected to the outer conductor 22 of a coupling coaxial line, and the other arm connected to the inner conductor 23 of this line. Preferably, the characteristic impedance of line 22, 23 is selected to be equal to the radiation resistance of antenna 21. Preferably, also, antenna 21 is selected to be resonant at the center frequency of the frequency range of operation of the device. A flat conducting reflector 25 is positioned adjacent antenna 21 to increase its sensitivity. Reflector 25 is preferably rigidly mounted on line 22, 23 to form a compact, rugged structure.

Line 22, 23 terminates within resonator 12 with a coupling loop 24 connecting inner conductor 23 to outer conductor 22 and thereby inductively coupling antenna 21 to the resonator 11. Resonator 11 is provided with a radially extending fixed sleeve 26 surrounding the line 22, 23. The line 22, 23 is made slidably and rotatably adjustable within the sleeve 26 in order to adjust the coupling between antenna 21 and resonator 11. The rotational position of coupling loop 24 relative to resonator 11 may be maintained by a suitable set screw 27 clamping the outer conductor 22 with respect to the sleeve 26 of resonator casing 12. It will be understood that with coupling loop 24 in the position shown in Fig. 1, maximum coupling is obtained between antenna 21 and resonator 11. Upon rotation through 90 degrees, coupling loop 24 will have minimum coupling with resonator 11, and varying degrees of coupling between these values can be obtained by intermediate positions of the loop 24.

A similar coaxial line, having outer conductor 28 and inner conductor 29, is coupled to resonator 11 by a similar coupling loop 31. Lines 22, 23 and 28, 29 are in coaxial alignment along a diameter of the cylindrical casing 12 of resonator 11. Loops 24 and 31 therefore provide coaxially aligned electrodes coupling lines 22, 23 and 28, 29, respectively, to resonator 11.

Coupled to the outer end of line 28, 29 is a detector 30 having a crystal 32 (or any other unilaterally conducting device) imbedded in a conductive means such as threaded metallic slug or support 33. A "cat's whisker" or wire 34 has one end connected to inner conductor 29 and its lower end contacting crystal 32 in a well-known manner. If desired, crystal 32 and cat's whisker 34 may be of the permanently-affixed type. Inner conductor 29 thus forms a terminal member for the detector 30. Outer conductor 28 terminates in a tapered or conical portion 36 about which is placed a thin layer of high efficiency dielectric material 37, such as the material known by the trade-name "Victron". This may be provided in the form of a tape wrapped around the conical extension 36. Cooperating with the tapered portion 36 is a similarly internally-tapered portion 38 of a housing or tubular member 39 which encloses and houses the crystal 32. Member 39, which has an internally-threaded portion for engagement with the reduced-diameter externally-threaded portion of support 33, may be held in position in any suitable manner, such as by a forced fit in which the dielectric material 37 is jammed between the cooperating conical faces 36 and 38. Thus, a further conductive means including for instance outer conductor 28 and inner conductor 29 extend beyond the end of tubular member 39, with the lower end of outer conductor 28 having a reduced-diameter portion extending into tubular member 39. The dielectric material 37 and its cooperating metallic members 36 and 38 form an efficient by-pass condenser at the frequency of operation of the system; and, accordingly, crystal 32 will act as a crystal detector of the energy supplied to it by line 28, 29, in well-known manner.

It will be noted that the length of the wire 34 is greater than the spatial separation between the region of the inner conductor 29 where the wire 34 is joined thereto and the region of the crystal 32 where the wire 34 makes contact therewith whereby the wire 34 extends therebetween in an irregular manner.

Viewed somewhat differently, it will be noted that tubular conductive means are provided, which may include outer conductor 28 and housing member 39, with a support 33 contacting a portion of the inner surface of housing member 39.

A suitable direct-current or audio frequency indicating device, such as indicated schematically by meter 41, may then be connected between the normally grounded outer conductor 28 and the crystal housing 39. It will be understood that, if desired, an audio or a direct current amplifier may be connected in place of indicator 41 to feed any suitable type of receiving device, such as earphones or a further indicator, where desired.

Coupling loop 31 is also made rotatable with respect to resonator 11 and may be fixed with respect thereto by a suitable set screw 42 in a sleeve 43 (similar to sleeve 26) within which line 28, 29 is rotatably mounted.

The design considerations for the device of Fig. 1 may best be understood by reference to Figs. 2 and 3. Fig. 2 illustrates the equivalent circuit diagram of the device of Fig. 1, in which inductance $L_2$ and capacitance $C_2$ represent the tuned circuit provided by resonator 11. The inductance $L_1$ represents the coupling loop 24, while the inductance $L_3$ represents the coupling loop 31. The mutual inductance between coupling loop 24 and resonator 11 is represented by $M_{12}$, and the corresponding mutual inductance between loop 31 and resonator 11 is represented by $M_{23}$. Capacitance $C_3$ represents the by-pass condenser provided by the dielectric material 37, and the crystal detector is illustrated at 30. The indicating device is connected to the output terminals 35.

Under the condition that the antenna 21 is tuned to resonance, the effective equivalent circuit is as shown in Fig. 3, where antenna 21 is indicated as a source 21' and $R_1$ now represents the radiation resistance of antenna 21. $R_2$ represents the equivalent series resistance of the resonator 11. $R_3$ is the load represented by the crystal detector 30.

If the "Q" of the resonator (or of the circuit $L_2$, $C_2$, $R_2$) be called $$Q_2 = \frac{L_2 \omega}{R_2}$$

(where $\omega$ is the circular frequency) and the apparent "Q" of the system as measured by the width of its resonance curve is called $Q'$, then the following relationship applies:

$$Q' = \frac{Q_2}{1 + \frac{Q_2 (M_{23}\omega)^2}{R_3 \sqrt{\frac{L_2}{C_2}}}} \qquad (1)$$

From this, it can be seen that the effective "Q" of the system, $Q'$, can be regulated by varying $M_{23}$ and can range from as low as may be desired (when $M_{23}$ is large) up to $Q_2$ (when $M_{23}$ is zero). Also, for any chosen value of $M_{23}$, there exists an optimum value of $M_{12}$ which gives the maximum power transfer into the resistance $R_3$. This value is given by the following equation:

$$(M_{12}\omega)^2 = \frac{R_1 \sqrt{\frac{L_2}{C_2}}}{Q'} \qquad (2)$$

If $M_{12}$ is set to this optimum value, the ratio of the power collected by the antenna 21 to the power reaching $R_3$ can be written as follows:

$$\frac{\text{Power into } R_3}{\text{Power input}} = \frac{Q_2 (M_{23}\omega)^2}{R_3 \sqrt{\frac{L_2}{C_2}}} \times \frac{1}{1 + \frac{Q_2 (M_{23}\omega)^2}{R_3 \sqrt{\frac{L_2}{C_2}}}}$$

$$= \frac{Q'(M_{23}\omega)^2}{R_3 \sqrt{\frac{L_2}{C_2}}} \qquad (3)$$

$$= \frac{(M_{23})^2 R_1}{(M_{12})^2 R_3}$$

Accordingly, for lower values of $Q'$ with respect to $Q_2$ (for larger $M_{23}$) a greater portion of the incoming power is passed to the crystal detector.

For a resonant circuit of the type shown in Fig. 1 having a concentric line approximately a quarter-wave long, a value of $Q_2$ of about 5,000 can be derived. If higher values of Q are desired, a non-reentrant resonator; for example, a cylindrical resonator with flat ends, could give values of Q up to 50,000. For the resonator of Fig. 1, the quantity $$\sqrt{\frac{L_2}{C_2}}$$

(resonator shunt impedance) will be of the general order of twice the velocity of light or 60 ohms. Also, $R_1$, being just the radiation resistance of the antenna, will be of the same order. $R_3$, the apparent resistance of the crystal detector will be of the order of 500 to 1,000 ohms for a silicon detector. Accordingly, $(M_{23}\omega)^2$ and $(M_{12}\omega)^2$ will be quite small in comparison with the resonator shunt impedance so that rather small coupling loops will produce sufficient mutual inductance to derive the advantages of the present invention.

In operation as a receiver, tuning is accomplished by moving the plunger 14. The sharpness of the resonance, that is, the selectivity, is adjusted by rotating the coupling loop 31 to vary $Q'$ by varying $M_{23}$. For any chosen setting of coupling loop 31, coupling loop 24 is rotated to vary $M_{12}$ to give maximum signal strength.

The present device may also be used as a comparison-type wave meter. For example, where it is desired to tune two separate sources to the same frequency, the device of Fig. 1 is supplied with energy from one source and is tuned by adjustment of plunger 14 until the indicator 41 provides a maximum reading, thus indicating that the resonator 11 is tuned accurately to the frequency of the first source. For such measurements, it is desirable to use maximum selectivity, which may be adjusted in the manner described above. Thereafter, without changing the setting of plunger 14, a second source is coupled to the device and is varied in frequency until again a maximum indication is provided by indicator 41. In this way it is known that the two sources are accurately tuned to substantially the same frequency.

Frequency comparisons may also be made by the present invention by permitting antenna 21 to receive energy simultaneously from two sources of relatively close frequency, one of which is known and the other of which is unknown. Plunger 14 is then tuned to provide a maximum amplitude of the beat note which will be produced by detector 30. The frequency of this beat note may be measured by any low frequency apparatus coupled in place of indicator 41 to thus provide an indication of the value of the unknown frequency relative to the known frequency.

The device may also be used as a field intensity meter. For this purpose indicator 41 is preferably a direct current meter. Then, after the resonator 11 is tuned to resonance at the frequency of the field to be measured, the relative readings of meter 41 will indicate relative field intensities. By suitably calibrating meter 41, direct readings may be made.

It is to be understood that energy may be supplied to resonator 11 by other means than antenna 21; for example, line 22, 23, instead of being coupled to antenna 21, may be coupled directly to any source whose output frequency it is desired to indicate or whose output it is desired to detect. However, the illustrated arrangement of antenna 21, resonator 11, and detector 30 provides a very simple, capable, neat, and rugged receiving device having many useful properties in relation to reception, detection, frequency indication, field intensity indication, and so forth.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. High frequency apparatus comprising a cavity resonator, means for tuning said resonator to vary the resonant frequency thereof, a coaxial line having a coupling loop between the inner and outer conductors thereof at one end, said coupling loop being positioned within said cavity resonator and rotatably adjustable with respect thereto, a dipole antenna having a pair of legs connected respectively to said inner and outer conductors at the other end of said coaxial line, a metallic reflector fixed to said coaxial line between said antenna and said resonator, a second coaxial line having a second similar coupling loop also positioned within said resonator and rotatably adjustable with respect thereto to vary the selectivity of said resonator, a crystal detector having one terminal connected directly to the inner conductor of said second line, means capacitively coupling the other terminal of said detector to the outer conductor of said second line, and indicating means connected to said detector.

2. The method of operating high frequency apparatus having a tunable cavity resonator, an input adjustably coupled to said resonator, and detecting means adjustably coupled to said resonator, comprising the steps of tuning said resonator to a desired received frequency, adjusting the coupling between said resonator and said detecting means to provide a desired selectivity of said apparatus, and adjusting the coupling between said input and said resonator to produce a desired power transfer to said detecting means.

3. A method of operating high frequency apparatus having a hollow conducting casing providing a cavity resonator, an input adjustably coupled to said resonator, and detecting means adjustably coupled to said resonator, comprising the steps of adjusting the selectivity of said apparatus by adjusting the coupling between said resonator and said detecting means, and adjusting the coupling between said input and said resonator to produce a desired power transfer to said detecting means.

4. High frequency apparatus comprising a tunable cavity resonator, an input for said resonator adapted to be excited by an input wave and terminating in a first loop within said resonator, an output for said resonator adapted to be coupled to a utilization device and terminating in a second loop within said resonator, means for adjusting the selectivity of said apparatus comprising means for rotatably adjusting said second loop, and means for adjusting the signal strength in said resonator, comprising means for rotatably adjusting said first loop.

5. High frequency detecting means comprising a cylindrical resonator having a sleeve rigidly supported coaxially therein and an adjustable tuning plunger supported by and within said sleeve, a concentric line section having an inner conductor and an outer conductor coupled together at one end to form a coupling loop positioned within said cavity resonator and rotatably adjustable with respect thereto, a crystal detector comprising a crystal unit and a holder for said crystal unit, means connecting said crystal directly to said inner conductor, and means capacitively coupling said holder to said outer conductor.

6. High frequency apparatus comprising a closed hollow cylindrical conducting casing providing a resonator chamber, a plunger positioned concentrically within said chamber and axially adjustable therewithin to vary the frequency of said resonator chamber, said plunger being supported in slidable contact with a snugly fitting sleeve located within said resonator chamber and rigidly secured to said casing, means for supplying high frequency energy to said chamber, concentric line means for removing high frequency energy from said chamber, and a detector crystal coupled to said concentric line means.

7. High frequency apparatus comprising a hollow conducting casing providing an interior resonant chamber, said chamber having an adjustable resonant frequency and adjustable selectivity, a plunger positioned within said chamber and adjustable therewithin to vary said frequency, said plunger being supported by a snugly fitting sleeve located within said resonator chamber and rigidly secured to said casing, adjustable means for supplying desired amounts of high frequency energy to said chamber, adjustable concentric line means for removing high frequency energy therefrom and varying the selectivity thereof, a detector crystal directly connected to one conductor of said concentric line means, and by-pass condenser means coupling said crystal to the other conductor of said concentric line means.

8. High frequency apparatus comprising a hollow conducting casing providing an interior resonant chamber, means for adjusting the frequency of said chamber, concentric line means comprising an adjustable coupling loop for supplying high frequency energy to said chamber, additional concentric line means comprising an adjustable coupling loop for removing high frequency energy from said chamber and varying said selectivity, and a detector coupled to said additional concentric line means.

9. High frequency apparatus comprising means defining a resonant chamber having an adjustable selectivity, means for supplying high frequency energy to said chamber, a concentric line means having an adjustable loop coupled to said chamber for conducting high frequency energy therefrom, said loop being adjustable to vary said selectivity of said chamber, and detector means coupled to said concentric line for rectifying said conducted energy.

10. High frequency apparatus comprising a hollow conducting casing providing an interior resonant chamber, an electrode for supplying high frequency energy to said chamber, said electrode being rotatably adjustable to vary the power output from said chamber, a second electrode for removing high frequency energy from said chamber, said second electrode being rotatably adjustable to vary the selectivity of said chamber, and a detector connected to said second electrode.

11. High frequency apparatus comprising a hollow conducting casing providing an interior resonant chamber, concentric line means comprising an adjustable coupling loop for supplying high frequency energy to said chamber, additional concentric line means having an adjustable coupling loop for removing high frequency energy from said chamber, said coupling loops being adjustable to vary the selectivity and output power of said chamber, and a detector coupled to said additional concentric line means.

12. High frequency apparatus comprising a resonant chamber, concentric line means having a first adjustable coupling loop for supplying high frequency energy to said chamber, said first coupling loop being adjustable to control the output power from said chamber, additional concentric line means having a second adjustable coupling loop for removing high frequency energy from said chamber, said second coupling loop being adjustable for controlling the selectivity of said chamber, and a detector coupled to said additional concentric line means.

13. High frequency apparatus comprising a cavity resonator, a first coaxial line arranged to couple electro-magnetic energy into said resonator, said first line having a first loop at one end thereof, and a second coaxial line arranged to couple electromagnetic energy from said resonator, said second line having a second loop at one end thereof, both said first and said second loops being contained substantially within said resonator and being rotatably adjustable, said second loop regulating the selectivity of said resonator as a function of its rotational position, and said first loop regulating the signal strength of energy contained within said resonator as a function of its rotational position.

14. Apparatus as in claim 13, wherein a detector is provided, said detector being connected to said second coaxial line.

15. Apparatus as in claim 14, wherein said detector is a crystal detector.

16. High frequency detecting apparatus comprising tubular conductive means, a conductive member substantially coaxially disposed within a portion of said tubular conductive means and spaced therefrom, a coaxial transmission line including substantially the coextensive parts of said tubular conductive means and said conductive member, support means contacting a portion of the inner surface of said tubular conductive means, a crystal substantially coaxially disposed within said tubular conductive means and supported by said support means, and a wire electrically connected between said conductive member and said crystal, said transmission line providing input terminals to said crystal.

17. Apparatus as in claim 16 wherein the length of said wire is greater than the spatial separation between said crystal and said conductive member, whereby said wire extends in an irregular manner.

WILLIAM W. HANSEN.

REFERENCES CITED

The following references are of record in the file of this patent:

UNITED STATES PATENTS

| Number | Name | Date |
|---|---|---|
| 1,003,375 | Schloemilch et al. | Sept. 12, 1911 |
| 1,534,769 | Brownlie | Apr. 25, 1925 |
| 1,537,856 | Michels et al. | May 12, 1925 |
| 1,576,783 | Pitts | Mar. 16, 1926 |
| 1,750,032 | Timtiman | Mar. 11, 1930 |
| 1,921,117 | Darbord | Aug. 8, 1933 |
| 2,086,615 | Grundmann | July 13, 1937 |
| 2,106,713 | Bowen | Feb. 1, 1938 |
| 2,142,630 | Conklin | Jan. 3, 1939 |
| 2,152,335 | Trevor | Mar. 28, 1939 |
| 2,218,923 | Newhouse | Oct. 22, 1940 |
| 2,235,521 | Higgins | May 18, 1941 |
| 2,245,138 | Zottu | June 10, 1941 |
| 2,258,953 | Higgins | Oct. 14, 1941 |
| 2,280,824 | Hansen et al. | Apr. 28, 1942 |
| 2,323,201 | Carter | June 29, 1943 |
| 2,349,440 | Lavoie | May 23, 1944 |
| 2,362,209 | Litton | Nov. 7, 1944 |
| 2,365,207 | Moles | Dec. 19, 1944 |
| 2,404,279 | Dow | July 16, 1946 |
| 2,406,405 | Salisbury | Aug. 27, 1946 |